United States Patent
Shimko et al.

(10) Patent No.: US 7,510,633 B2
(45) Date of Patent: Mar. 31, 2009

(54) ELECTROLYZER APPARATUS AND METHOD FOR HYDROGEN AND OXYGEN PRODUCTION

(75) Inventors: Martin A. Shimko, Quechee, VT (US);
Sandeep Verma, Monroe, CT (US);
Thomas Jackson, Milford, CT (US);
Jeram S. Kamlani, Milford, CT (US);
Deborah K. Moss, legal representative, Westport, CT (US)

(73) Assignee: Avalence LLC, Milford, CT (US)

( * ) Notice: Subject to any disclaimer, the term of this patent is extended or adjusted under 35 U.S.C. 154(b) by 240 days.

(21) Appl. No.: 10/546,614

(22) PCT Filed: Feb. 19, 2004
(Under 37 CFR 1.47)

(86) PCT No.: PCT/US2004/005182
§ 371 (c)(1), (2), (4) Date: Sep. 13, 2006

(87) PCT Pub. No.: WO2004/076721
PCT Pub. Date: Sep. 10, 2004

(65) Prior Publication Data
US 2007/0151865 A1    Jul. 5, 2007

(51) Int. Cl.
C25B 9/08 (2006.01)
(52) U.S. Cl. .................. 204/260; 205/628
(58) Field of Classification Search ........... 204/260; 205/628
See application file for complete search history.

(56) References Cited

U.S. PATENT DOCUMENTS

| 3,652,431 | A | * | 3/1972  | Reynolds    | 205/338 |
| 3,812,026 | A |   | 5/1974  | Fontaina    |         |
| 3,933,614 | A |   | 1/1976  | Bunn, Jr.   |         |
| 3,984,303 | A | * | 10/1976 | Peters et al. | 204/260 |
| 4,374,014 | A | * | 2/1983  | Smith et al. | 204/260 |

OTHER PUBLICATIONS

International Search Report and The Written Opinion of the International Search Authority for PCT/US2004/005182.

* cited by examiner

*Primary Examiner*—Bruce F Bell
(74) *Attorney, Agent, or Firm*—Townsend and Townsend and Crew LLP

(57) ABSTRACT

An electrolyzer cell (10) for the electrolysis of water comprises a cathode (12) of generally tubular configuration within which is disposed an anode (16) separated from the cathode (12) by a separation membrane (14) of generally tubular configuration which divides the electrolyte chamber (15) into an anode sub-chamber 15*a* and a cathode sub-chamber (15*b*). An electrolyzer apparatus (36) includes an array (38) of individual cells (10)across each of which an electric potential is imposed by a DC generator (40) via electrical leads (42*a*, 42*b*). Hydrogen gas generated within cells (10) from electrolyte (18) is removed via hydrogen gas take-off lines (20) and hydrogen manifold line (21). By-product oxygen is removed from cells (10) by oxygen gas take-off lines (22) and oxygen manifold line (23). The electrolyzer apparatus (36) may be configured to operate either batchwise or in a continuous electrolyterecycle operation to produce high purity hydrogen at high pressure, e.g., up to about (10,000) psig, without need for gas compressors to compress product hydrogen.

10 Claims, 2 Drawing Sheets

ELECTROLYZER APPARATUS AND METHOD FOR HYDROGEN AND OXYGEN PRODUCTION

BACKGROUND OF THE INVENTION

1. Field of the Invention

The present invention concerns an electrolyzer apparatus and method to produce high-pressure hydrogen at pressures up to 10,000 psig or higher, by means of electrolysis of water and without necessity of separate compression equipment. Direct electrolytic generation of such high-pressure hydrogen (and by-product oxygen) is attainable by the practices of the present invention.

2. Related Art

Electrolytic production of hydrogen is, of course, well known, as illustrated by U.S. Pat. Nos. 5,665,211 for "Electrolysis Apparatus for Producing Hydrogen"; U.S. Pat. No. 6,033,549 for "Method of Electrolysis"; U.S. Pat. No. 6,071,386 for "Electrolysis Apparatus; and U.S. Pat. No. 6,153,083 for "Electrolyzer Isolated by Encapsulation with Respect to Pressurized Water".

Known electrolytic equipment, sometimes herein referred to as "electrolyzers", using liquid electrolyte to generate hydrogen, operates in the following way. Two electrodes are placed in a bath of liquid electrolyte, such as an aqueous solution of potassium hydroxide (KOH). A broad range of potassium hydroxide concentration may be used, but optimally, a concentration of about 25 to 28% by weight KOH solution is used. The electrodes are separated from each other by a separation membrane that selectively allows passage of liquid but not gas through it. When a voltage is impressed across the electrodes (about 2 volts), current flows through the electrolyte between the electrodes. Hydrogen gas is produced at the cathode and oxygen gas is produced at the anode. The separation membrane keeps the hydrogen and oxygen gases separated as the generated gas bubbles rise through the liquid electrolyte. There is a disengagement space above the liquid electrolyte comprised of two separate chambers or two sections isolated from each other by being separated by a gas-tight barrier into two separate sections, one chamber or section to receive the hydrogen gas and the other to receive the oxygen gas. The two gases are separately removed from the respective sections of the disengagement pace for storage or venting.

SUMMARY OF THE INVENTION

Generally, in accordance with the present invention, there is provided an electrolytic apparatus and a method of generating pressurized hydrogen and by-product oxygen directly from the apparatus, without necessity of a separate pressurization step. The electrolytic apparatus, usually referred to as an "electrolyzer", has a tubular cathode within which a rod-like anode is disposed to define between the anode and cathode an electrolyte chamber. A tubular separation membrane is disposed between the anode and the cathode to divide the electrolyte chamber into an anode sub-chamber and an electrolyte sub-chamber. In a specific embodiment, the anode, separation membrane and cathode have a coaxial configuration, so that the anode sub-chamber and the cathode sub-chamber are of concentric, annular configuration. The two electrolyte sub-chambers are respectively connected in gas-flow communication to respective gas/liquid separators to provide segregated hydrogen and oxygen sections from which the two generated gases are separately withdrawn.

Specifically, in accordance with the present invention there is provided an electrolyzer cell for the electrolysis of water having first and second opposite ends and comprising the following components. A cathode of tubular configuration is connectable to a source of DC electricity, and defines a cathode active inner surface and a cathode outer surface. An anode is connectable to a source of DC electricity, defines an anode active outer surface, and is disposed within the cathode to define therewith an annular electrolyte chamber disposed between the cathode inner surface and the anode outer surface. A separation membrane of tubular configuration is disposed within the electrolyte chamber between the cathode and the anode to divide the electrolyte chamber into an anode sub-chamber and a cathode sub-chamber. The separation membrane serves to seal against the passage therethrough of gases. First and second gas-tight seals are disposed at, respectively, the first and second opposite ends of the cell. A gas take-off connection is in liquid- and gas-flow communication with the electrolyte chamber for removing from the cell gases generated in the electrolyte chamber.

In accordance with another aspect of the invention, the gas take-off connection is dimensioned and configured to remove gas generated in the cathode sub-chamber separately from gas generated in the anode sub-chamber.

In another aspect of the invention, the cathode, separation membrane and anode are all disposed coaxially relative to each other, and the cathode inner surface, the anode outer surface and the separation membrane are each of circular configuration in transverse cross section.

Other aspects of the present invention provide that the electrolyzer cell may further comprise a pressure vessel separate from and surrounding and contacting the outer surface of the cathode or, alternatively, the cathode itself may comprise a pressure vessel. In either case, one aspect of the invention provides that the pressure vessel is capable of containing gas at an elevated pressure, which elevated pressure is at least about 10 psig. In some cases, the elevated pressure is not greater than about 10,000 psig, e.g., is not greater than about 5,000 psig.

Yet another aspect of the present invention provides that at least one of the gas-tight seals comprises an anode-sealing collar affixed to the anode adjacent one end thereof; an electrical isolation bushing, which may be cup-shaped to define a recess in which the anode-receiving collar is received, the bushing being affixed to the anode between the anode-sealing collar and the one end of the anode, the bushing engaging the anode-sealing collar; and an end fitting engaging the bushing and providing a gas-tight seal of the cathode at one end thereof.

Another aspect of the invention provides an electrolyzer comprising a plurality of electrolyzer cells as described above, first gas-flow conduits connected in liquid- and gas-flow communication between the respective cathode sub-chambers of the plurality of cells and a first gas collector; and second gas-flow conduits connected in liquid- and gas-flow communication between the anode sub-chambers of the plurality of cells and a second gas collector.

In accordance with a method aspect of the present invention there is provided a method of electrolyzing water to generate pressurized hydrogen and oxygen therefrom utilizing an electrolyzer comprising one or more electrolyzer cells. The cells individually comprise (i) a cathode of tubular configuration within which a rod-shaped anode is disposed to define an annular-shaped electrolyte chamber between the cathode and the anode, (ii) a separation membrane of tubular configuration disposed within the electrolyte chamber between the cathode and the anode to divide the electrolyte chamber into an anode sub-chamber and a cathode sub-chamber and seal the sub-chambers against gas flow therebetween. The method comprises the following steps: (a) introducing an aqueous solution of electrolyte, e.g., an aqueous solution of potassium hydroxide, into both sub-chambers of the electrolyte chamber; (b) applying a DC voltage drop across the respective anodes and cathodes of the cells to dissociate water into hydrogen at the cathode and into oxygen at the anode; and (c) separately withdrawing hydrogen and oxygen from the one or more electrolyzer cells.

In another method aspect of the present invention, the cell further comprises a pressure vessel and the hydrogen and oxygen are generated at an elevated pressure of at least about 10 psig, e.g., a pressure not greater than about 10,000 psig, or not greater than about 5,000 psig.

Method aspects of the present invention include one or more of the following, alone or in suitable combinations: the pressure differential between the hydrogen and oxygen withdrawn from the cells is maintained at not more than about 0.25 psig, preferably, not more than about 0.2 psig, and more preferably not more than about 0.17 psig.

Electrolyte and product hydrogen are flowed into a hydrogen separator, electrolyte and by-product oxygen are flowed into an oxygen separator, the respective electrolyte liquid levels in the hydrogen and oxygen separators are sensed and controlled to maintain a pressure differential between the hydrogen and oxygen withdrawn from the cells of not more than about 0.2 psig.

The electrolyte may be, but need not be, recirculated through the electrolyzer in a continuous operation.

DETAILED DESCRIPTION OF THE INVENTION
AND SPECIFIC EMBODIMENTS THEREOF

Figure 1:
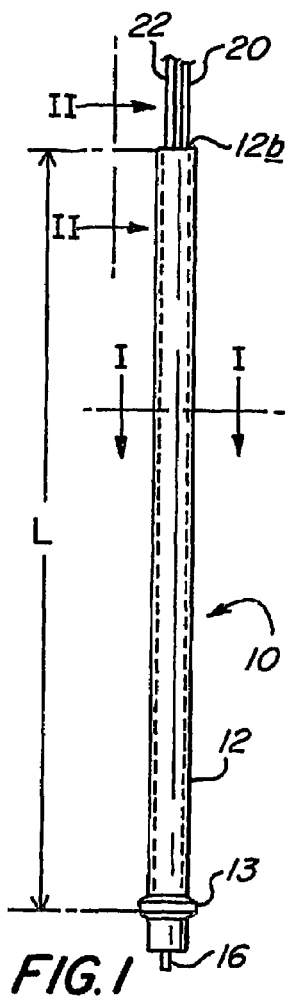
FIG. 1 is an elevation view of a gas-generation cell in accordance with one embodiment of the present invention.
Figure 1A:
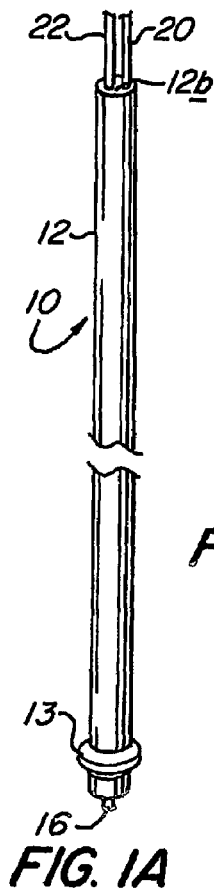
FIG. 1A is a perspective view, partly broken-away, of the gas-generation cell of FIG. 1.
Figure 1B:
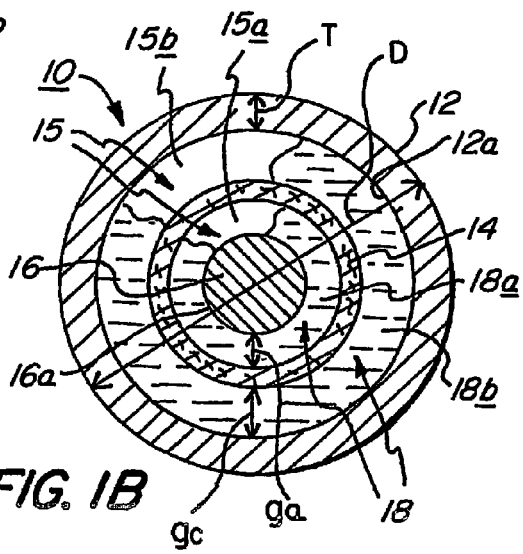
FIG. 1B is a transverse cross-sectional view, enlarged relative to FIG. 1 and taken along line I-I of FIG. 1, showing electrolyte contained within the cell, the body of electrolyte being broken away for improved clarity of illustration.
Figure 1D:
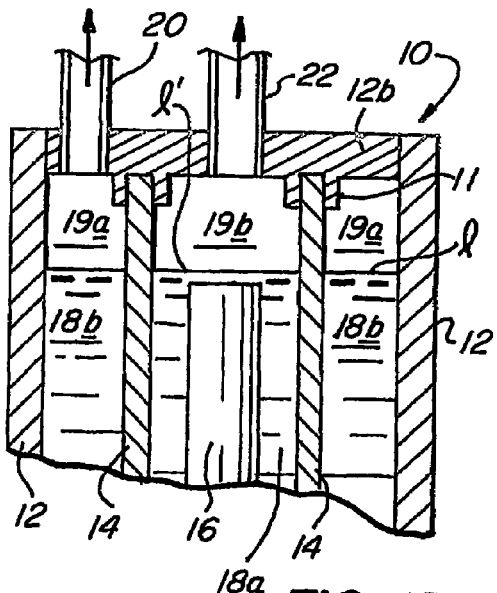
FIG. 1D is a longitudinal cross-section view, enlarged relative to FIG. 1 and taken along line II-II of FIG. 1.

Referring to FIGS. 1, 1A and 1B, there is shown a gas-generation cell 10 comprising a cathode 12 which also serves as an outer containment shell, a separation membrane 14 (FIG. 1B) and an anode 16. Cathode 12 has an inner surface 12a and anode 16 has an outer surface 16a. Surfaces 12a and 16a are active electrode surfaces which are exposed to, and in contact with, a liquid electrolyte 18 which is contained within electrolyte chamber 15 of gas-generation cell 10. Electrolyte chamber 15 is defined by the space between surfaces 12a and 16a. As seen in FIG. 1B, separation membrane 14 divides electrolyte chamber 15 into an anode sub-chamber 15a containing an anode portion 18a of electrolyte 18, and a cathode sub-chamber 15b, containing a cathode portion 18b of electrolyte 18. It is seen that the anode 16, cathode 12, and separation membrane 14 are configured coaxially, with the tubular separation membrane 14 disposed coaxially within the tubular cathode 12 and the rod-shaped anode 16 disposed coaxially within the separation membrane 14. As shown in FIG. 1B, cathode 12 and separation membrane 14 are of annular shape in transverse cross section, thereby imparting the same cross-sectional annular shape to the anode and cathode sub-chambers 15a and 15b. Cathode 12 is separated from the anode and sealed at one end against high pressure by seal 13 (FIGS. 1 and 1A). A gas-tight seal 12b (FIG. 1D) closes the other end of cell 10. Gas-tight seal 12b is shown in simplified schematic form for simplicity of illustration; its construction will be similar to that of gas-tight seal 13 except that, as shown in FIG. 1D, the anode 16 does not protrude through it, but stops short of it. A pair of gas take-off lines 20 and 22 protrude through gas-tight seal 12b to establish liquid- and gas-flow communication with the interior of gas-generation cell 10, as described below. The cathode 12 serves as the hydrogen-generating electrode and the anode 16 serves as the oxygen-generating electrode. The illustrated configuration of cell 10 separates the liquid electrolyte 18 into an anode electrolyte portion 18a and a cathode electrolyte portion 18b. The liquid electrolyte may be, for example, a 25% to 28% by weight KOH aqueous solution contained within electrolyte chamber 15, i.e., between the electrodes 12, 16 on both sides of the separation membrane 14. A plurality of individual gas-generation cells formed in this manner may be assembled into an array for use in an electrolyzer, as described below.

Upon imposition of a direct current ("DC") voltage drop, typically about from 1.5 to 3 volts, preferably about 2 volts, across cathode 12 and anode 16, hydrogen gas is generated at cathode 12 within cathode sub-chamber 15b of electrolyte chamber 15, and oxygen gas is generated at anode 16 within anode sub-chamber 15a of electrolyte chamber 15.

The cathode component may, but need not necessarily, also serve as the pressure boundary of the electrolysis cell. That is, in some embodiments the cathode also serves as the containment or pressure vessel, whereas in other embodiments the co-axially disposed anode, separation membrane and cathode may all be contained within a pressure vessel, enabling thin-wall construction of the cathode as well as the anode.

For high pressure generation in cases where the cathode also serves as the pressure vessel, the wall thickness T of cathode 12 and consequently the outside diameter D of the cell 10 is dictated by the desired generation pressure, by material properties such as yield strength and electrical conductivity of the metal from which cathode 12 is made, and by practical considerations limiting the wall thickness of cathode 12 which, as noted above, also may serve as the containment vessel of cell 10. For inexpensive steel or other suitable metal tube or pipe material, consistent with hydrogen embrittlement constraints, there are practical limits on the diameter D of individual cells for generation at 10,000 psig. These practical limits are imposed by practical limits on the wall thickness T of cathode 12 and result in a range of diameter D of from about 2 to 3½ inches (about 5.1 to 8.9 cm). Generally, the wall thickness T may vary from about ¼ to ⅝ inches (about 0.64 to 1.59 cm). The length L of the individual cell 10 is determined by the desired gas-generation rate, generation pressure, and annular flow gaps. Typically, the length L of the cell 10 is from about 2 to 6 feet (about 0.61 to 1.83 meters). The annular flow gaps are shown in FIG. 1B by the radial dimension lines $g_c$ (cathode annular flow gap) and $g_a$ (anode annular flow gap). Typical dimensions for the cathode annular flow gap $g_c$ are from about 3/16 to 3/8 inches (about 0.48 to 0.96 cm), and for the anode annular flow gap $g_a$ are from about 1/8 to 1/4 inches (about 0.32 to 0.64 cm).

A simple construction, shown in FIG. 1D, is used to maintain the balance of pressure across the separation membrane 14 within the individual cells 10 to within 2 inches of water (less than 0.1 psig). Maintaining such pressure balance enables maintaining product (hydrogen) purity because the separation membrane 14 cannot seal against gas leakage at pressure differentials exceeding a few inches of water. Gastight seal 12b has a circular flange 11 on the inside thereof in which is formed a groove (unnumbered) within which the end of separation membrane 14 is received to provide a gas-tight seal between cathode disengagement space 19a and anode disengagement space 19b. A similar grooved-flange construction may or may not be supplied at the inside of seal 13 (FIGS. 1 and 1A) to seal the opposite end of separation membrane 14.

Gas off-take line 20 transports hydrogen gas from cathode disengagement space 19a (FIG. 1D) within cell 10 above the level 1 of cathode electrolyte portion 18b of liquid electrolyte 18. Gas take-off line 22 transports oxygen gas from anode disengagement space 19b within cell 10 above the level 1' of anode electrolyte portion 18a of a liquid electrolyte 18. The respective hydrogen and oxygen disengagement spaces are isolated from each other by a gas-tight bulkhead structure (not shown).

Figure 1C:
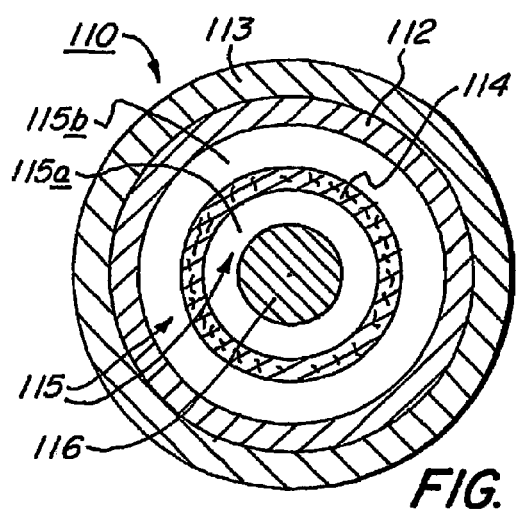
FIG. 1C is a view corresponding to that of FIG. 1B, except that a body of electrolyte corresponding to that shown in FIG. 1B is omitted, showing a gas generation cell in accordance with a second embodiment of the present invention.

FIG. 1C shows a second embodiment of the invention, wherein parts identical or similar to those of the embodiment of FIG. 1B are numbered 100 higher than the numbers used in FIG. 1B. With the single exception noted, the parts and their function of cell 110 of FIG. 1C are identical to those of the corresponding parts of the embodiment of FIG. 1B, and therefore a description of their structure and function is not repeated. In cell 110, anode 112 is not designed to resist the operating pressures of cell 110, and there is therefore provided a pressure vessel 113 which is separate from, but surrounds and contacts, the outer surface (unnumbered) of cathode 112. Pressure vessel 113 has end portions (not shown) which encase the first and second ends of cell 110 to provide an effective pressure vessel for cell 110.

The illustrated configuration of cell 10 enables optimization of the electrode areas for the cathode and anode. Because the gas-generation rate (of hydrogen) at the cathode is twice the gas-generation rate (of oxygen) at the anode, the respective surface areas of cathode inner surface 12a and anode outer surface 16a ideally should have the same 2:1 ratio, or at least an approximation thereof, to allow the maximum gas-generation rate for a cell of given dimensions. The gas-generation rate is normally determined by the surface area 12a of the cathode for a given material and surface conditions. In prior art parallel plate electrode configurations, where the anode and cathode are of equal surface area, there is a wasteful excess of anode surface area. In contrast, in the coaxial configuration of the present invention, the diameter of the anode is smaller than the diameter of the cathode as measured at its inner surface 12a. The anode (outer) surface area is therefore smaller than the inner surface area of the cathode. The anode (outer) surface and the cathode inner surface are the surfaces in contact with the liquid electrolyte and therefore constitute the active electrode surfaces. The respective electrode diameters and annular flow gaps can be established to create a cathode-to-anode active surface area ratio near or at the optimum 2 to 1 value.

Figure 2:
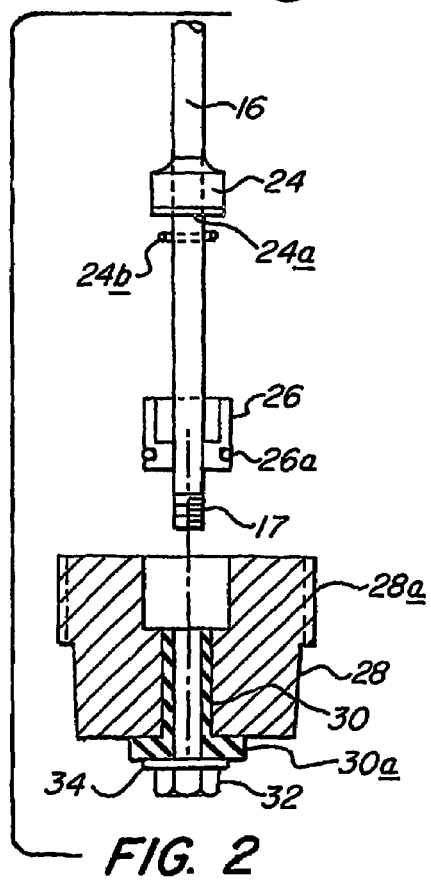
FIG. 2 is a longitudinal cross-sectional view, enlarged relative to FIG. 1, of a seal member in accordance with an embodiment of the present invention, and utilizable as a component of the gas-generation cell of FIG. 1.

Usually, the separation membrane 14 of FIG. 1B and the separation membrane 114 of FIG. 1C will be dimensioned and configured so that the volume of sub-chambers 15b and 115b are approximately twice the volume of their respective associated sub-chambers 15a and 115a. The individual cells 10 are sealed by providing a seal between the anode 16 and the containment vessel provided by the cathode 12 at each end of the latter. The seal must provide low voltage (~2 volts) electrical isolation between the anode and cathode as well as sealing the cell 10 against liquid leakage with internal pressures in the cell of up to about 10,000 psig or more. FIG. 2 is an illustration of a simple and effective seal design.

The seal 13 is comprised of four basic components. An anode-sealing collar 24 is made of metal and is welded to the anode 16 at an appropriate location to align it with the lower end of cathode 12 (FIG. 1). Collar 24 may alternately be made by machining anode 16 from a larger-diameter rod so that collar 24 and anode 16 are of one-piece, unitary construction. An O-ring groove 24a is machined into the bottom end surface (unnumbered) of sealing collar 24 to receive an O-ring 24b. An electrical isolation bushing 26 is of cup shape and is made of a dielectric material to provide an electrical isolation piece through which the anode 16 passes. Bushing 26 is made from non-conducting material and has an O-ring groove (unnumbered) formed about the periphery thereof to receive an O-ring 26a. A high-pressure end fitting 28 is made of metal and provides an end piece through which the anode passes and which seals the lower end of the cathode 12 by means of either threading or welding. The outer diameter of the end fitting 28 may be threaded to provide exterior threads 28a to mate with inner diameter threads (not shown) provided at both ends of the inner surface 12a (FIG. 1B) of the containment vessel wall provided by cathode 12. The end fitting maybe welded to the lower end of the cathode. Either arrangement forms a seal against the high gas pressure generated within cathode 12.

An electrical insulating sleeve 30 has a sleeve bore 33 extending through it and is disposed within the end-fitting bore (unnumbered) extending through high-pressure end fitting 28. Anode 16 is received within the sleeve bore 33. Electrical insulating sleeve 30 thus serves to maintain electrical isolation between the anode 16 and cathode 12 outside the pressurized area within cathode 12. Sleeve 30 also has an end flange 30a that electrically isolates a nut 32 which is threaded onto the anode 16, at threads 17 formed at or near the end thereof, and is used to preload and hold the entire assembly together. A washer 34 is interposed between nut 32 and end flange 30a.

It will be appreciated that the various components, i.e., anode-sealing collar 24, electrical isolation bushing 26, and end fitting 28 are so dimensioned and configured as to position and maintain anode 16 at the center of the electrolyte chamber 15 (FIG. 1B) defined between cathode 12 and anode 16. Structure is similarly provided to position and hold separation membrane 14 in place concentrically relative to anode 16 and cathode 12. This may be accomplished by one or more suitable positioning members which are dimensioned and configured to position and maintain separation membrane 14 in place.

Figure 3:
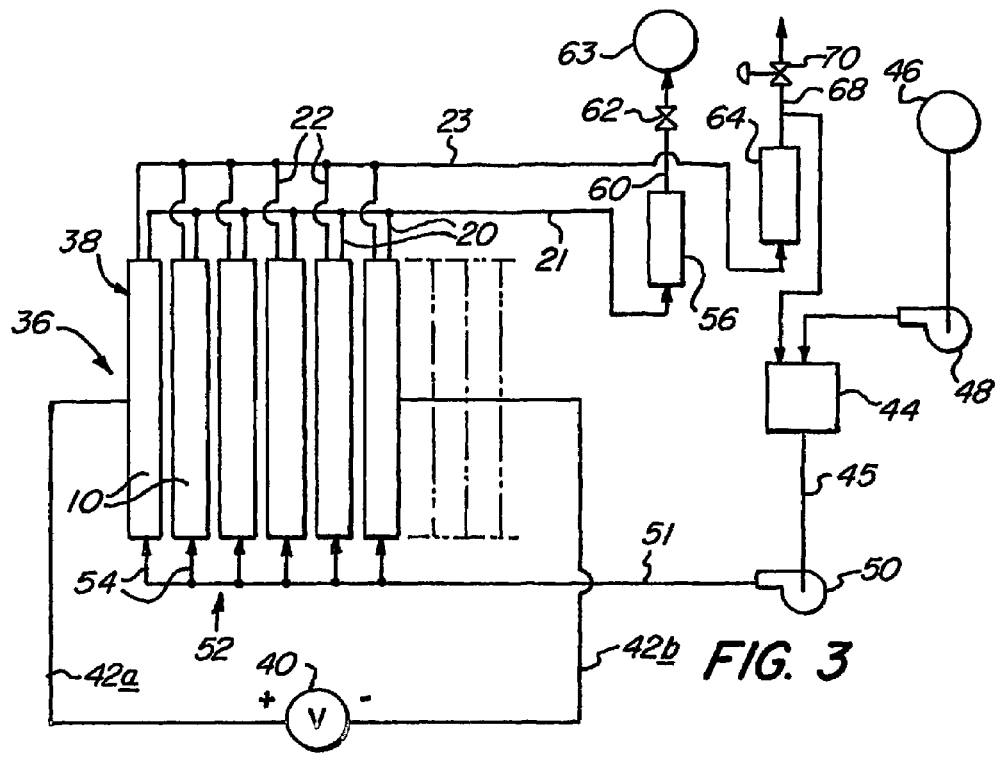
FIG. 3 is a schematic flow diagram showing an electrolyzer apparatus in accordance with one embodiment of the present invention and including an array of a plurality of gas-generation cells of the type illustrated in FIGS. 1 through 1B.

Referring now to FIG. 3, an electrolyzer apparatus 36 comprises an array 38 of individual cells 10 across each of which an electric potential is imposed by an electrical energy source provided, in the illustrated embodiment, by a DC generator 40. Electrical leads from generator 40 to cells 10 are schematically illustrated by electrical leads 42a, 42b. A given hydrogen production capacity for electrolyzer apparatus 36 is attained by appropriately sizing individual cells 10 and selecting an appropriate number of such cells for connection to a common manifold system as described below. In use, a method for producing hydrogen (with an oxygen by-product) is carried out by utilizing an electrolytic apparatus as described above to produce hydrogen (and oxygen by-product) at an elevated pressure of up to 10,000 pounds per square inch gauge ("psig"), for example, a pressure range from about 0 to about 10,000 psig. The upper end of this pressure range (from about 5,000 to about 10,000 psig) is uniquely well suited to directly provide hydrogen fuel for storage in high-pressure storage vessels of hydrogen-based fuel cell-powered automobiles or other self-propelled vehicles, or portable or stationary devices. Any pressure ranges between about 0 to about 10,000 psig may of course be used. Typical of such intermediate ranges are pressures above about 3,000 psig, e.g., from above about 3,000 psig to about 10,000 psig; from about 3,500 psig to about 8,000 psig; and from about 3,500 psig to about 10,000 psig. Generation of hydrogen at pressures above 10,000 psig may be feasible in certain aspects of the invention, provided that it is economically practical for the contemplated use to provide pressure vessels and associated equipment capable of sustaining such high pressures.

An electrolyte reservoir 44 is supplied by make-up water pump 48 with make-up water from water treatment and storage zone 46 in order to replenish water which was dissociated by electrolysis to provide product hydrogen and oxygen. Electrolyte is taken from the electrolyte reservoir 44 and is fed by supply line 45 to electrolyte-replenishing pump 50 from which it is transported via electrolyte feed line 51 to an electrolyte manifold 52 which supplies the electrolyte liquid to individual cells 10 via electrolyte feed lines 54.

Hydrogen gas generated within cells 10 and some electrolyte 18 (FIG. 1B) is removed via gas off-take lines 20 and hydrogen manifold line 21 to hydrogen separator 56, wherein liquid electrolyte 18 (FIG. 1B) is separated from the hydrogen gas. Hydrogen product from hydrogen separator 56 is flowed via hydrogen discharge line 60 and is free to flow through check valve 62 and into hydrogen storage tank 63, or to use or further treatment. Separated electrolyte provides a liquid seal within hydrogen separator 56. Hydrogen pressure will continue to rise as hydrogen is supplied to the fixed volume storage tank 63. Similarly, oxygen and liquid electrolyte 18 is removed from cells 10 by gas off-take lines 22, which supply oxygen manifold line 23. The oxygen gas and liquid electrolyte 18 flow via line 23 to oxygen separator 64 in which liquid electrolyte is separated from the oxygen. Separated oxygen flows via oxygen discharge line 68 at a rate, which is controlled by oxygen pressure regulator 70, to an oxygen storage tank (not shown) or to venting or to use or further treatment. Separated electrolyte provides a liquid seal within oxygen separator 64. The oxygen flow rate is controlled to maintain the liquid level in separator 64 to be equal to the liquid level in separator 56. The same operational function could be performed by maintaining the pressure in separator 64 to be equal to the pressure in separator 56. This allows the individual cells 10 to be operated in a flooded condition with the generated gas bubbles passing through the gas off-take lines 20, 22 leading from each cell to the separators 56, 64 and the common reservoir 44. In such mode of operation, the levels 1, 1' of electrolyte 18 shown in FIG. 1D are maintained at a higher level within the apparatus illustrated in FIG. 3. The electrolyte 18, in such case, floods the cells 10, gas take-off lines 20 and 22, hydrogen manifold line 21 and oxygen manifold line 23, the electrolyte surface level in such case being at level 1 of FIG. 4.

The separators 56 and 64 are sized in cross-section so as to act as a liquid trap preventing or greatly reducing electrolyte carry over and loss of potassium hydroxide. Make-up potassium hydroxide may be added to the system as needed, e.g., manually during shut-downs for periodic maintenance. In addition, the oxygen gas exiting the oxygen separator is connected to the gas space over the liquid in the electrolyte reservoir to maintain reservoir pressure at near cell pressure. This enables the electrolyte supply pump to operate as a low differential pressure circulator. Make-up water is only added to the electrolyte reservoir when level sensors in the reservoir (not shown) indicate the need to replenish the reservoir liquid.

Check valve 62 allows the hydrogen product gas to flow through line 60 into a storage tank 63 or to further processing or use when the hydrogen gas pressure in cells 10 exceeds that in line 60, e.g., in the hydrogen storage tank 63. A pressure sensor (not shown) acts to automatically shut off the electrical current to the electrolyzer apparatus 36 when the maximum design pressure in hydrogen storage tank 63 has been reached.

Figure 4:
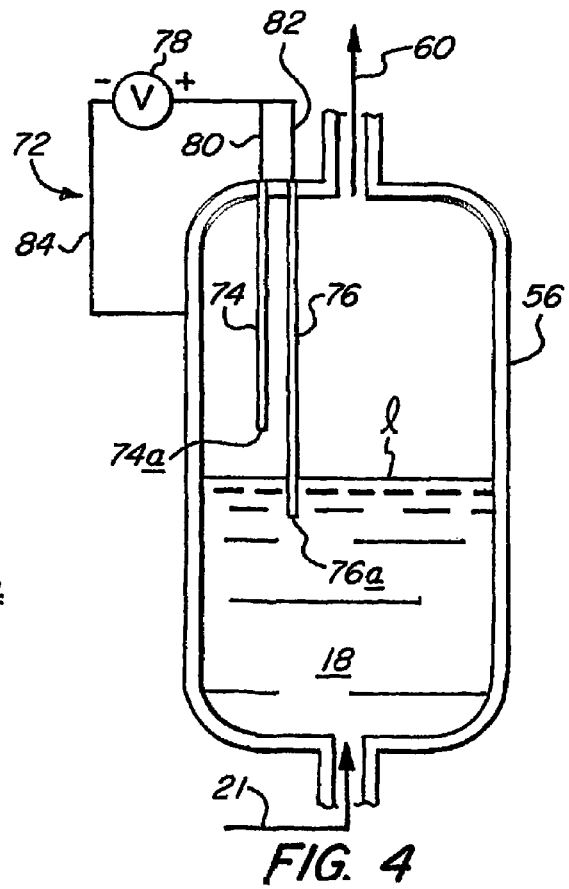
FIG. 4 is a schematic, cross-sectional view of a liquid level sensor utilizable in one embodiment of the electrolyzer apparatus of FIG. 3.

The liquid level in the hydrogen separator 56 is sensed by a simple level-sensing device, shown in FIG. 4, which is mounted on hydrogen separator 56. Level-sensing device 72 comprises a pair (or more) of electrically isolated probes 74, 76 that extend into the separator 56 at lengths that define the maximum and minimum desired level 1 of liquid electrolyte 18 in the separator 56 at, respectively, probe tips 74a and 76a. The electrically isolating seal is essentially the same design as the cathode/anode seal 13 (FIGS. 1 and 1A) described above. A low-voltage source 78, typically, less than about 1.5 volts, is connected by electrical leads 80, 82 to probes 74, 76 and is grounded to separator 56 by electrical ground lead 84. Electrical continuity is checked between the probes 74, 76 and the shell of separator 56. If the electrolyte level drops below the lower level, i.e., no continuity is found in either probe, the electrolyte supply pump 50 is actuated and electrolyte is sent to the cells. When electrical continuity is sensed on both probes 74 and 76, the electrolyte has reached the maximum level and the electrolyte supply pump 50 is stopped, and no more electrolyte is sent to the cells. If the conductive electrolyte is between the two probe lengths, i.e., continuity is found on one probe only, the make-up water pump 48 status is left unchanged, whether on or off, until one of the two above mentioned conditions is met.

The flow of oxygen can be easily controlled to minimize the pressure differential between the separators (and therefore across the diaphragm) in either of two ways: differential pressure sensing, or liquid-level sensing.

In the differential pressure-sensing technique, the flow from the oxygen separator 64 is controlled by pneumatically actuated pressure regulator valve 70. In this case the actuator diaphragm (not shown) of valve 70 is connected by lines (not shown) to sense the pressure differential between the gas in the oxygen separator 64 and hydrogen separator 56, and opens to vent the gas space of oxygen separator 64 to maintain a set pressure differential. This pressure differential is set at near zero, e.g., a pressure differential of about from 0.17 to 0.2 psig, so that the pressure balance inherently keeps the liquid levels in the two separators 56, 64 stable and equal to within the differential pressure setting.

In the direct liquid-level sensing technique, a liquid-level sensor identical to liquid-level sensing of FIG. 4 is installed on device 72 in the oxygen separator 64. In this case the valve 70 regulating the flow of gas from the oxygen separator 64 cycles between high and low (or on and off) settings. This simple level-control scheme is satisfactory for operation of cells 10. The setting of valve 70 is determined by the liquid electrolyte level in separator 64 as follows. When the valve 70 is at its high flow setting and the liquid level in the oxygen separator 64 rises and reaches the high level contact (analogous to probe tip 74*a* of FIG. 4), the valve 70 is switched to its low flow-rate position by a suitable electronic control device (not shown). When the valve 70 is in the low flow setting and the liquid level drops and reaches the low level contact (analogous to probe tip 76*a* of FIG. 4), the valve 70 is switched to its high flow-rate position by the control device.

In a different embodiment of the present invention, the electrolyte is circulated in a continuous recycle operation. This continuous-operation embodiment enables the production of high-pressure hydrogen with the potential to increase the length, and therefore the production rate, for a given cell. In the batch mode embodiment described thus far, the individual cell length is limited by a combination of the cell dimension (flow gap), gas volume generation rate, and bubble rise rate. Circulating the electrolyte upward through the cell at appropriate rates in a continuous recycle embodiment of the invention will increase the bubble rise rate via entrainment and allow longer cathode and electrode length for otherwise similarly dimensioned cells. To implement this recycle approach the separator reservoirs (items 56 and 64 in FIG. 3) would be altered by adding a return path for the electrolyte from separators 56 and 64 back to the electrolyte reservoir (item 44 in FIG. 3). The remainder of the apparatus schematically shown in FIG. 3 and the basic control system as described above for the batch mode embodiment stays largely unaltered for the electrolyte-circulating continuous recycle embodiment.

The present invention provides at least the following advantages over the prior art.

1. The coaxial anode/cathode configuration allows very high-pressure hydrogen generation with practical wall thicknesses of conventional materials in the containment vessel provided by the cathode 12. The value of this invention is further enhanced by the use of advanced pressure-containment materials, such as composite structures, which may make practical larger individual cell sizes at elevated pressures. The co-axial configuration also allows optimization of the surface areas of anode 16 and cathode 12, as described above.

2. Independent gas/liquid separators (such as separators 56, 64) are used for each of the hydrogen and oxygen production sides. This allows multiple gas-generation cells 10 to be connected to common gas/liquid separation vessels (e.g., 56, 64) and the utilization of a liquid electrolyte level control system.

3. A novel, low-cost pressure seal design for entry of the anode 16 into the gas-generation cell 10 enables satisfaction of high-pressure and electrical isolation requirements at reasonable cost.

4. The invention provides a simple, inexpensive control strategy for untended operation during hydrogen production, including automated control of the level of liquid electrolyte 18, or the control of the differential pressure between the separators (56 and 64) and release of generated hydrogen and oxygen gases, such that high-purity gas products are obtained.

The ability of the apparatus and method of the present invention to enable hydrogen (and oxygen) production at pressures of up to or even exceeding 10,000 psig exceeds the highest direct generation pressure of about 3,000 psig that has been previously reported as attainable from prior known electrolyzers. The apparatus and method of the present invention can produce such high-pressure hydrogen without need for a separate compressor to pressurize the product hydrogen gas. Producing 10,000 psig hydrogen is key to supplying compressed hydrogen gas for fuel-cell-powered or internal combustion engine-powered vehicles at acceptable volume-to-weight ratios for onboard storage that yields a single-tank driving range equivalent to gasoline powered vehicles. The present invention allows high-pressure hydrogen production to be performed in a unique way that reduces the component cost and system complexity so that the equipment is easily affordable by individuals for commuter vehicle home fueling and for small fleet fueling applications. The invention is scalable to any given production capacity and is also practical for service-station type applications for dispensing of hydrogen to fuel-cell-powered vehicles and equipment.

The apparatus and method of the present invention may be utilized to generate pressurized hydrogen on site at locations such as service stations for hydrogen fuel cell-powered automobiles; service stations, hardware/home improvement stores, and local energy distributors for retail sale of hydrogen fuel via high-pressure canisters; and in residences, factories and office buildings for on-site energy storage and/or use in fuel cell or internal combustion engine-based portable power supply or home, garden or other appliance applications.

The present invention has been described in detail with reference to a particular embodiment thereof, but those skilled in the art will recognize that the invention may be utilized in other embodiments. Conventional known devices such as pressure-sensing and flow-rate sensing devices, and controls to operate valves and pumps, have been largely omitted from the description, as such devices and their use are well known in the art.

What is claimed is:

1. An electrolyzer cell having first and second opposite ends and comprising:
   a cathode of tubular configuration and pressure-containing construction which is connectable to a source of DC electricity, and defines a cathode active inner surface, at which hydrogen is generated, and a cathode outer surface;
   an anode which is connectable to a source of DC electricity, defines an anode active outer surface, at which oxygen is generated, and is disposed within the cathode to define therewith an annular electrolyte chamber disposed between the cathode inner surface and the anode outer surface;
   a seperation membrane of tubular configuration disposed within the electrolyte chamber between the cathode and the anode to divide the electrolyte chamber into an anode sub-chamber and a cathode sub-chamber, the separation membrane sealing against the passage therethrough of gases but permitting passage of liquid borne ions;
   first and second gas-tight seals disposed at, respectively, the first and second opposite ends of the cell and sealing the electrolyte chamber against the passage therethrough of gases; and
   a gas take-off connection in gas-flow communication with the electrolyte chamber for removing the hydrogen and oxygen gases generated in the electrolyte chamber;
   wherein at least one of the gastight seals comprises:
   an anode-sealing collar affixed to the anode adjacent one end thereof;
   an electrical isolation bushing affixed to the anode between the anode-sealing collar and the one end of the anode, the bushing engaging the anode-sealing collar; and an end fitting engaging the bushing and providing a gastight seal of the cathode at one end thereof.

2. The electrolyzer cell of claim 1 where the gas take-off connection is dimensioned and configured to remove the hydrogen gas generated in the cathode sub-chamber out from the electrolyte chamber separately from the oxygen gas generated in the anode sub-chamber.

3. The electrolyzer cell of claim 1 wherein the cathode, separation membrane and anode are all disposed coaxially relative to each other, and the cathode inner surface, the anode outer surface and the separation membrane are each of circular configuration in transverse cross section.

4. The electrolyzer cell of claim 1, wherein the ratio of the cathode inner surface to the anode outer surface is at least about 2:1.

5. The electrolytic cell of claim 1, wherein the ratio of the volume of the cathode sub-chamber to the anode sub-chamber is at least about 2:1.

6. The electrolyzer cell of claim 1, wherein the cell further comprises a pressure vessel separate from and surrounding and contacting the outer surface of the cathode.

7. The electrolyzer cell of claim 1, wherein the cathode itself comprises a pressure vessel.

8. The electrolyzer cell of claim 1, further comprising a pressure vessel, wherein the pressure vessel is capable of containing gas at an elevated pressure, which elevated pressure is at least about 10 psig and is not greater than about 10,000 psig.

9. The electrolyzer cell of claim 1 wherein the electrical isolation bushing is cup-shaped to define a recess in which the anode-receiving collar is received;
the end fitting has a longitudinal bore extending therethrough and the electrical isolation bushing and the one end of the anode are received within the longitudinal bore and affixed to the end fitting.

10. The electrolyzer cell of claim 1, further including:
a hydrogen separator that receives a withdrawn hydrogen and liquid electrolyte mixture from the cathode sub-chamber;
an oxygen separator that receives a withdrawn oxygen and liquid electrolyte mixture from the anode sub-chamber; and
control means for controlling the rate of liquid level change in the hydrogen and oxygen separators to maintain the pressure differential between the withdrawn hydrogen and oxygen.

* * * * *